(12) United States Patent
Oda

(10) Patent No.: US 9,042,641 B2
(45) Date of Patent: May 26, 2015

(54) CHARACTER RECOGNITION APPARATUS, CHARACTER RECOGNITION METHOD, AND COMPUTER-READABLE MEDIUM

(71) Applicant: FUJI XEROX CO., LTD., Minato-ku, Tokyo (JP)

(72) Inventor: Hideto Oda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 186 days.

(21) Appl. No.: 13/903,489

(22) Filed: May 28, 2013

(65) Prior Publication Data

US 2014/0119641 A1 May 1, 2014

(30) Foreign Application Priority Data

Oct. 31, 2012 (JP) .................................. 2012-241275

(51) Int. Cl.
G06K 9/00 (2006.01)
(52) U.S. Cl.
CPC ........ G06K 9/00422 (2013.01); G06K 9/00409 (2013.01)
(58) Field of Classification Search
None
See application file for complete search history.

(56) References Cited

U.S. PATENT DOCUMENTS

2005/0286771 A1* 12/2005 Bishop et al. ................. 382/202
2008/0123940 A1* 5/2008 Kundu et al. ................. 382/159

FOREIGN PATENT DOCUMENTS

| JP | 61-033583 A | 2/1986 |
| JP | 09-034992 A | 2/1997 |
| JP | 2007-034440 A | 2/2007 |

* cited by examiner

Primary Examiner — Utpal Shah
Assistant Examiner — Narek Zohrabyan
(74) Attorney, Agent, or Firm — Sughrue Mion, PLLC

(57) ABSTRACT

A character recognition apparatus includes an extracting unit extracting a feature point for a line in a handwritten character, first and second generation units, a learning unit, and a determination unit. The first generation unit generates first feature data from feature points for lines including an in-same-character line (first line) and being selected from lines in character-code-specified handwritten characters (known lines). The second generation unit generates second feature data from feature points for lines including an after-character-transition line (second line) and being selected from known lines. The learning unit causes a discriminator to learn classifications for first and second lines based on the first and second feature data. The determination unit determines whether each line in character-code-unknown handwritten characters is a first or second line, based on which classification is determined by the discriminator for feature data for the line.

10 Claims, 6 Drawing Sheets

CHARACTER RECOGNITION APPARATUS, CHARACTER RECOGNITION METHOD, AND COMPUTER-READABLE MEDIUM

CROSS-REFERENCE TO RELATED APPLICATIONS

This application is based on and claims priority under 35 USC 119 from Japanese Patent Application No. 2012-241275 filed Oct. 31, 2012.

BACKGROUND (i) Technical Field

The present invention relates to a character recognition apparatus, a character recognition method, and a computer-readable medium.

(ii) Related Art

There is an issue in that the accuracy of character segmentation is to be improved when a pattern which has been input is segmented into characters in online handwritten character recognition.

SUMMARY

According to an aspect of the present invention, there is provided a character recognition apparatus including an extracting unit, a first generation unit, a second generation unit, a learning unit, and a determination unit. The extracting unit extracts a feature point for a line in a handwritten character. The first generation unit generates first feature data based on a feature point extracted by the extracting unit, for a line group which includes an in-same-character line and which is selected from lines included in a handwritten character string containing multiple handwritten characters. Each of the handwritten characters is a character for which a character code is specified. The in-same-character line is a line in a character identical to a character for a previous line which is written just before the in-same-character line. The second generation unit generates second feature data based on a feature point extracted by the extracting unit, for a line group which includes an after-character-transition line and which is selected from lines included in a handwritten character string containing multiple handwritten characters. Each of the handwritten characters is a character for which a character code is specified. The after-character-transition line is a line in a character different from a character for a previous line which is written just before the after-character-transition line. The learning unit causes a discriminator to learn a classification for an in-same-character line and a classification for an after-character-transition line on the basis of the first feature data and the second feature data. The determination unit determines whether each of lines included in a handwritten character string in which character codes are unknown is an in-same-character line or an after-character-transition line, on the basis of which classification is determined by the discriminator for feature data based on a feature point extracted by the extracting unit from the line.

BRIEF DESCRIPTION OF THE DRAWINGS

Exemplary embodiment of the present invention will be described in detail based on the following figures, wherein.

DETAILED DESCRIPTION

An exemplary embodiment for carrying out the present invention (hereinafter, referred to as an exemplary embodiment) will be described below with reference to the drawings.

Functional Blocks

Figure 1:
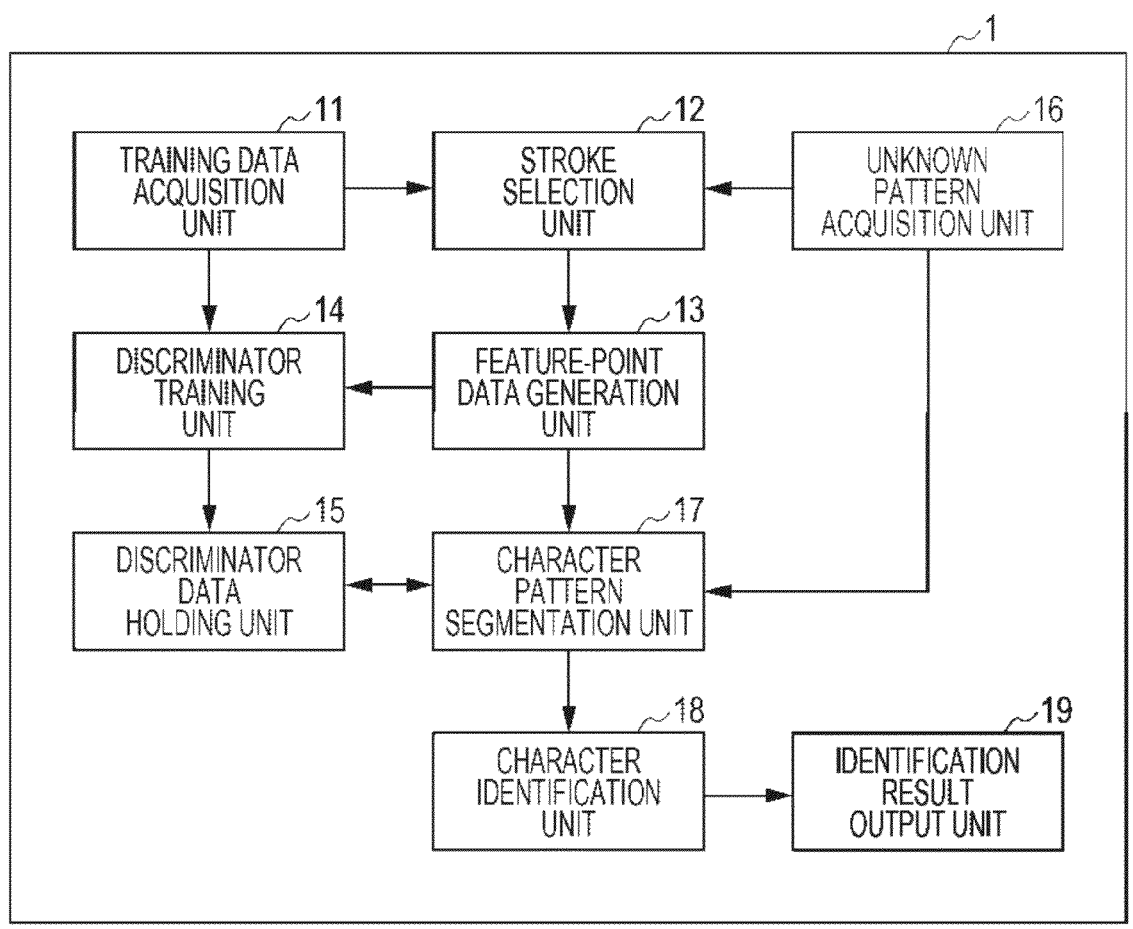
FIG. 1 is a block diagram illustrating functions of a character recognition apparatus according to an exemplary embodiment.

FIG. 1 is a block diagram illustrating functions of a character recognition apparatus 1 according to the exemplary embodiment. As illustrated in FIG. 1, the character recognition apparatus 1 includes a training data acquisition unit 11, a stroke selection unit 12, a feature-point data generation unit 13, a discriminator training unit 14, a discriminator data holding unit 15, an unknown pattern acquisition unit 16, a character pattern segmentation unit 17, a character identification unit 18, and an identification result output unit 19. The character recognition apparatus 1 according to the exemplary embodiment specifies character codes of characters included in an online handwritten character string. An online handwritten character string includes information about shape data and stroke order for the strokes included in the handwritten character string.

Functions of the above-described units included in the character recognition apparatus 1 may be achieved in such a manner that a computer which includes a control unit such as a central processing unit (CPU), a storage unit such as a memory, and an input/output unit which receives/transmits data from/to an external device reads and then executes programs stored in a computer-readable information storage medium. The programs may be supplied to the character recognition apparatus 1 which is a computer via an information storage medium, such as an optical disk, a magnetic disk, a magnetic tape, a magneto-optical disk, or a flash memory. Alternatively, the programs may be supplied via a data communications network such as the Internet.

The training data acquisition unit 11 acquires training data for training a discriminator which recognizes a character. For example, training data may include information about a handwritten character string constituted by multiple character patterns, each of which includes one or more strokes (handwritten lines) which are associated with each other in terms of writing order, and information about character codes for the respective character patterns included in the handwritten character string.

The stroke selection unit 12 selects a stroke group including a stroke to be processed, from a handwritten character string included in training data acquired from the training data acquisition unit 11 and from a handwritten character string acquired from the unknown pattern acquisition unit 16. For example, the stroke selection unit 12 may select a target stroke (the i-th stroke) from strokes included in a handwritten character string to be processed, and may select the previous stroke (the (i−1)th stroke) written just before the selected target stroke and the next stroke (the (i+1)th stroke) written just after the selected target stroke, as a stroke group indicating the characteristics of the target stroke. The stroke selection unit 12 may select a target stroke which belongs to a character pattern for the same character code as that for the previous stroke (hereinafter, referred to as an in-same-character stroke) and a target stroke which belongs to a character pattern for a character code different from that for the previous stroke (hereinafter, referred to as an after-character-transition stroke), from a handwritten character string included in training data.

The feature-point data generation unit 13 extracts feature points from each of the strokes included in the stroke group including the target stroke selected by the stroke selection unit 12, and generates feature-point data for the target stroke on the basis of the positions of the extracted feature points.

Figure 2A:
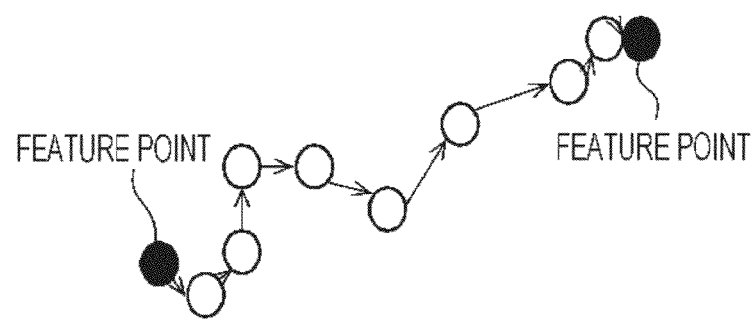
FIGS. 2A to 2D are diagrams for describing a process of extracting feature points.
Figure 2B:
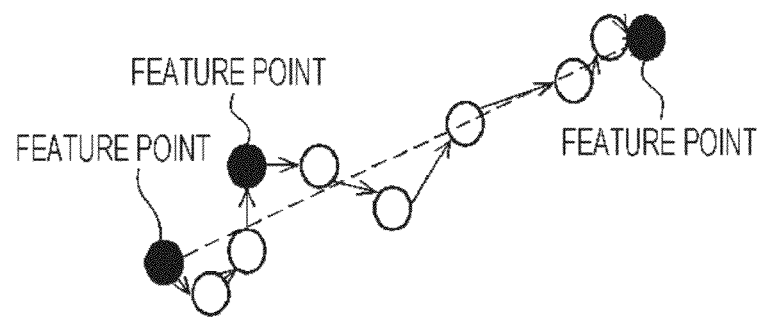
Figure 2C:
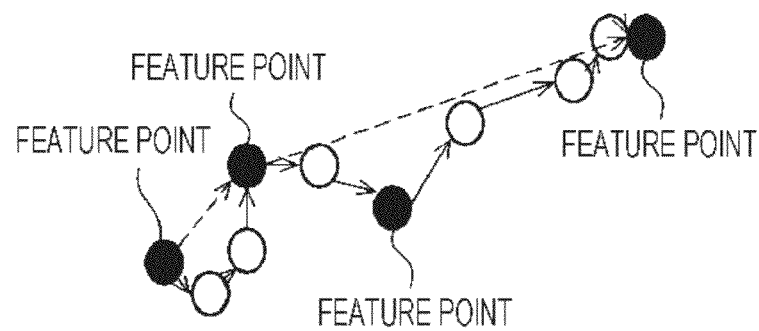
Figure 2D:
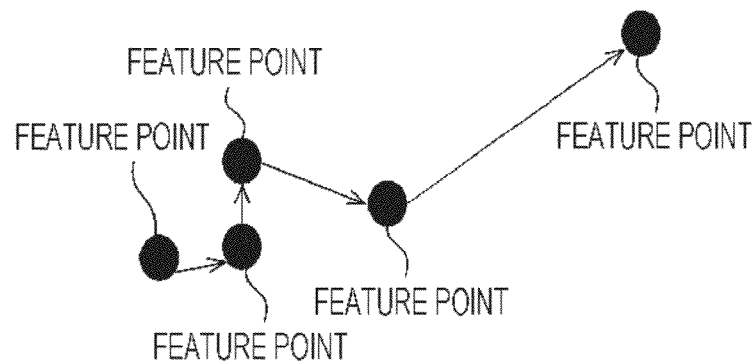

FIGS. 2A to 2D are diagrams for describing a process of extracting feature points from a stroke. FIGS. 2A to 2D illustrate a process of extracting feature points from a stroke on the basis of Douglas-Peucker approximation. As illustrated in FIG. 2A, the starting point and the endpoint of a stroke are regarded as feature points. Then, as illustrated in FIG. 2B, a point from which the distance to the line between the feature points is the largest is added as a feature point, and as illustrated in FIG. 2C, a line is redrawn on the basis of the added feature point. The processes illustrated in FIGS. 2B and 2C are repeatedly performed until the distance between a line and a point is equal to or less than a threshold, whereby feature points are extracted as illustrated in FIG. 2D.

Figure 3A:
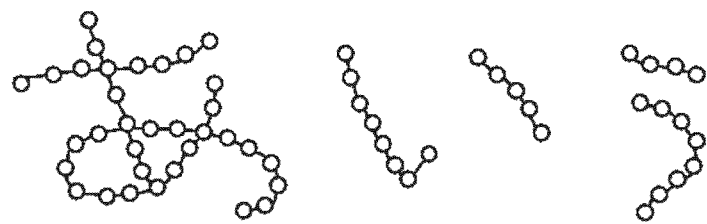
FIGS. 3A to 3D are diagrams for describing exemplary feature-point data.
Figure 3B:
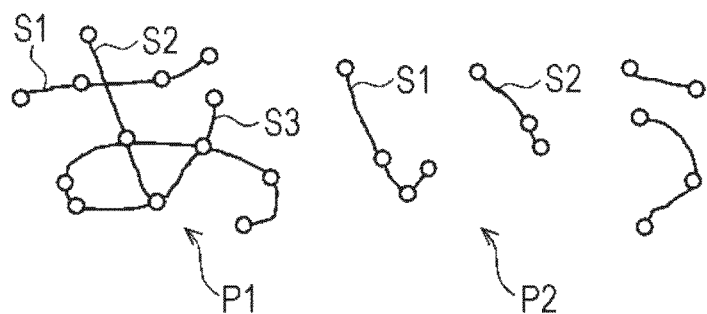
Figure 3C:
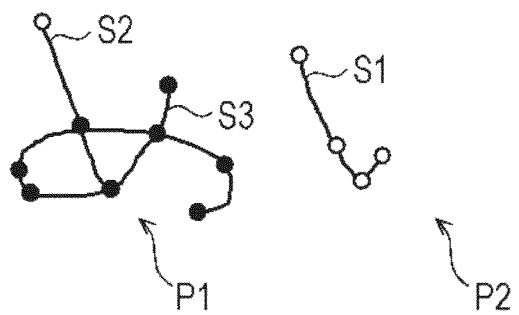
Figure 3D:
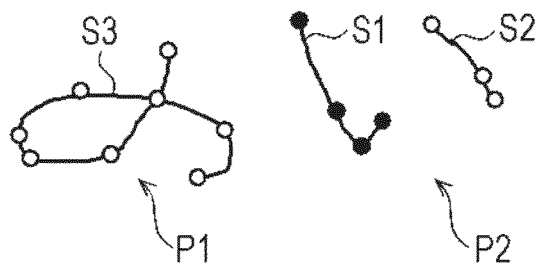

FIGS. 3A to 3D illustrate exemplary feature-point data for an in-same-character stroke and exemplary feature-point data for an after-character-transition stroke. When an online handwritten character string illustrated in FIG. 3A is processed, feature points are extracted from the strokes as illustrated in FIG. 3B. When a stroke S3 (P1) which is the third stroke in a character pattern P1 is a target stroke, the stroke S3 (P1) belongs to the same character code as that for a stroke S2 (P1) which is the second stroke in the character pattern P1. Therefore, the stroke S3 (P1) is an in-same-character stroke, and feature-point data for the stroke S3 (P1) is generated on the basis of the previous stroke S2 (P1) and a stroke S1 (P2) which is the next stroke and which is the first stroke in a character pattern P2, as illustrated in FIG. 3C. When the stroke S1 (P2) which is the first stroke in the character pattern P2 is a target stroke, the stroke S1 (P2) belongs to a character different from that for the stroke S3 (P1) which is the previous stroke. Therefore, the stroke S1 (P2) is an after-character-transition stroke, and feature-point data for the stroke S1 (P2) is generated on the basis of the previous stroke S3 (P1) and a stroke S2 (P2) which is the next stroke and which is the second stroke in the character pattern P2, as illustrated in FIG. 3D.

The discriminator training unit 14 causes a discriminator to learn how to classify a stroke as an in-same-character stroke or an after-character-transition stroke (here, the classification label for an in-same-character stroke is set to +1, and the classification label for an after-character-transition stroke is set to −1) on the basis of feature-point data generated by the feature-point data generation unit 13 for an in-same-character stroke included in a handwritten character string in training data acquired by the training data acquisition unit 11, and on the basis of feature-point data which is generated by the feature-point data generation unit 13 for an after-character-transition stroke included in the handwritten character string in the training data. An example will be described below in which a support vector machine (SVM) is used as a discriminator and in which the Gaussian dynamic time warping (GDTW) kernel is used as the kernel for the SVM.

When pieces of feature-point data (feature vector) $x_1$ to $x_N$, the number of which is N and which are generated by the feature-point data generation unit 13, and classification labels $t_1$ to $t_N$ which correspond to the respective pieces of feature-point data are given, an objective function $L_D$ of the SVM is expressed in Expression (3) by using multiplier parameters $\alpha_i$ ($\alpha_i \geq 0$, where i is an integer from 1 to N) which satisfy Expression (1) described below and by using a kernel function K expressed in Expression (2). The symbol σ is a kernel parameter.

$$\sum_{i=1}^{N} \alpha_i t_i = 0 \quad (1)$$

$$K(x_i, x_j) = \exp\left(-\frac{D_{DTW}(x_i, x_j)}{\sigma^2}\right) \quad (2)$$

$$L_D(\alpha) = \sum_{i=1}^{N} \alpha_i - \frac{1}{2} \sum_{i,j=1}^{N} \alpha_i \alpha_j t_i t_j K(x_i, x_j) \quad (3)$$

In the kernel function in Expression (2), assume that feature-point data $x_i$ has feature points, the number of which is I ($u_k$, where k is an integer from 1 to I), and that feature-point data $x_j$ has feature points, the number of which is J ($v_l$, where l is an integer from 1 to J). A distance $D_{DTW}(x_i, x_j)$ between the pieces of feature data $x_i$ and $x_j$ is calculated as $D_{IJ}$ on the basis of a distance obtained through dynamic programming using a feature point $u_k$ and a feature point $v_l$, in accordance with Expressions 4 to 6 described below. The expressions $u_k(x)$ and $u_k(y)$ represent the x coordinate and the y coordinate of the k-th feature point in the feature-point data $x_i$, respectively.

$$W_{00} = D_{00} \quad (4)$$

$$W_{kl} = D_{kl} + \min(W_{(k-1)l}, W_{k(l-1)}, W_{(k-1)(l-1)}) \quad (5)$$

$$D_{kl} = |u_k(x) - v_l(x)| + |u_k(y) - v_l(y)| \quad (6)$$

The discriminator training unit 14 calculates multipliers $\alpha_i$ so that the objective function $L_D$ is optimized (maximized), thereby obtaining a support vector (set S). A discriminant function f(x) is expressed in Expression (7) described below where a function sign(u) is a function of outputting 1 if u>0 and outputting −1 if u≤0. The symbol x represents feature-point data (feature vector) for a recognition target, and a threshold h is obtained through Expressions (8) and (9) shown below. The symbol $x_s$ represents any support vector.

$$f(x) = \text{sign}\left(\sum_{i \in S} \alpha_i t_i K(x_i, x) - h\right) \quad (7)$$

$$h = \omega^T x_s - t_s \quad (8)$$

$$\omega = \sum_{i \in S} \alpha_i t_i x_i \quad (9)$$

The discriminator data holding unit 15 holds parameters, e.g., information for specifying a support vector, which are calculated by the discriminator training unit 14.

The unknown pattern acquisition unit 16 acquires character patterns (online handwritten character string) to be recognized. For example, the unknown pattern acquisition unit 16 may acquire handwritten characters which are input into an input apparatus such as a touch panel connected to the character recognition apparatus 1, as an unknown pattern.

The stroke selection unit 12 sequentially selects strokes included in the unknown pattern acquired by the unknown pattern acquisition unit 16, as a target stroke. The feature-point data generation unit 13 sequentially generates feature-point data for the target strokes which are sequentially selected, and sequentially outputs the generated feature-point data to the character pattern segmentation unit 17.

Upon reception of feature-point data for a stroke included in the unknown pattern, the character pattern segmentation unit 17 classifies the stroke corresponding to the received feature-point data as an in-same-character stroke or an after-character-transition stroke on the basis of the received feature-point data and the parameters stored in the discriminator data holding unit 15, and segments the unknown pattern into character patterns on the basis of the classification result. For example, after a transition from one character to another is identified, the character pattern segmentation unit 17 may set strokes which are classified as in-same-character strokes, as elements in a single character pattern until another transition from one character to another is identified.

The character identification unit 18 inputs information about stroke shapes and writing order included in each of the character patterns into which the character pattern segmentation unit 17 segments the unknown pattern, into a predetermined offline character recognition engine, thereby identifying a character code.

The identification result output unit 19 outputs the character codes identified by the character identification unit 18. For example, the identification result output unit 19 generates output information for outputting the character codes identified by the character identification unit 18, and may output the output information to, for example, a display or a printer which is connected to the character recognition apparatus 1.

Flowcharts

Processes performed in the character recognition apparatus 1 will be described in detail below with reference to the flowcharts in FIGS. 4 to 6.

Learning Process

Figure 4:
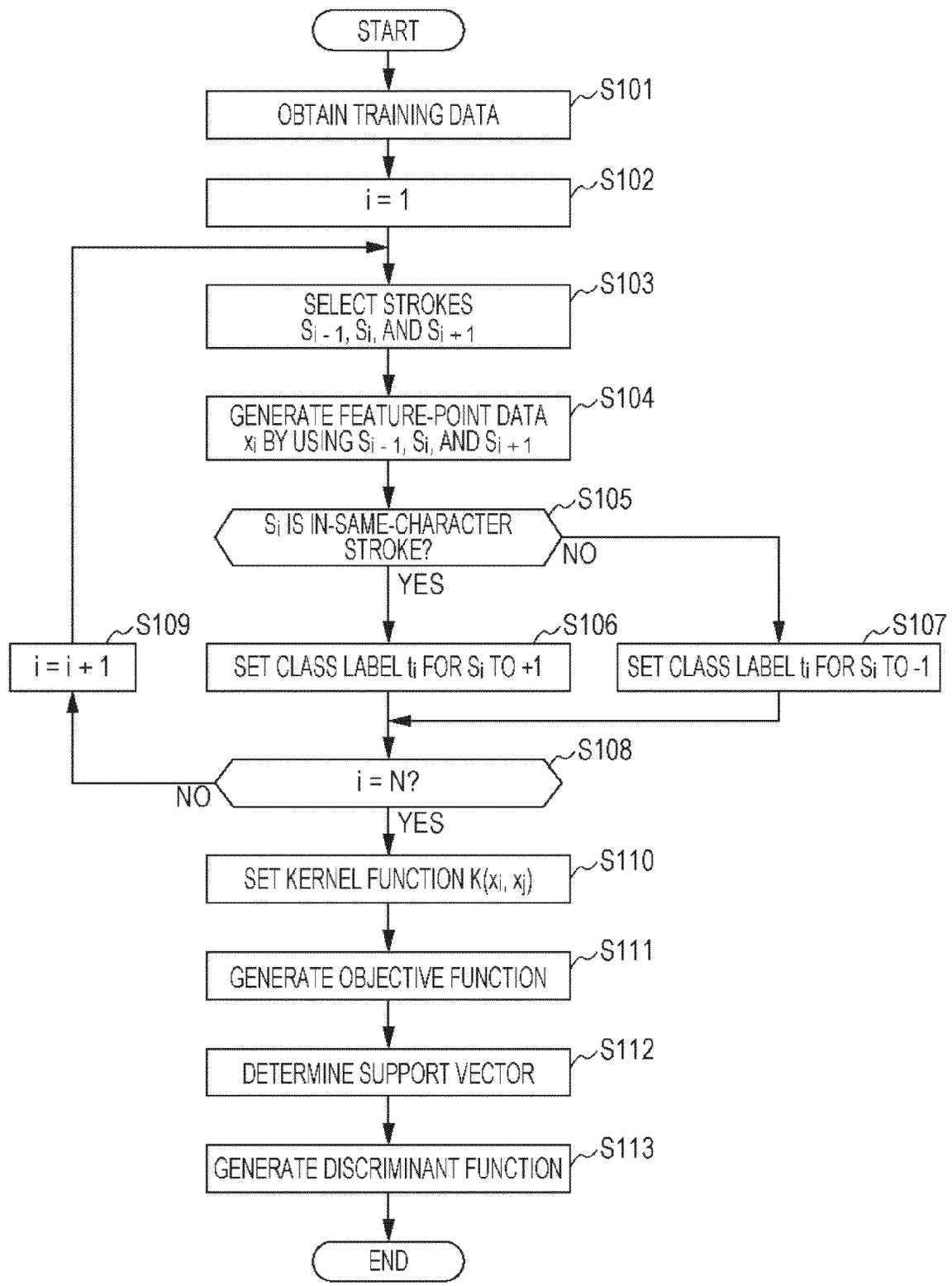
FIG. 4 is a flowchart of a learning process.

FIG. 4 is a flowchart of a learning process performed in the character recognition apparatus 1. A learning process is a process of causing a discriminator to learn how to classify a stroke as an in-same-character stroke or an after-character-transition stroke, on the basis of training data (supervised data) constituted by a handwritten character string for which segmentation of character patterns and character codes for the character patterns are already specified.

As illustrated in FIG. 4, the character recognition apparatus 1 obtains training data constituted by a handwritten character string for which segmentation of character patterns including one or more strokes and character codes for the character patterns are already specified (in step S101).

The character recognition apparatus 1 sets a variable i to 1 (in step S102), and selects three subsequent strokes from the strokes included in the training data as strokes $S_{i-1}$, $S_i$, and $S_{i+1}$ (in step S103). Strokes $S_{i-1}$, $S_i$, and $S_{i+1}$ may be randomly selected, or may be selected in accordance with the writing order of the strokes included in the training data.

The character recognition apparatus 1 extracts feature points from each of the selected strokes $S_{i-1}$, $S_i$, and $S_{i+1}$, and generates feature-point data $x_i$ for the stroke $S_i$ on the basis of the extracted feature points (in step S104).

If the stroke $S_i$ is an in-same-character stroke (YES in step S105), the character recognition apparatus 1 sets the class label $t_i$ for the stroke $S_i$ to +1 (in step S106). If the stroke $S_i$ is not an in-same-character stroke, that is, the stroke $S_i$ is an after-character-transition stroke (NO in step S105), the character recognition apparatus 1 sets the class label $t_i$ for the stroke $S_i$ to −1 (in step S107).

If the variable i does not reach N which is the predetermined number of pieces of training data (NO in step S108), the character recognition apparatus 1 increments the variable i by 1 (in step S109), and the process returns back to step S103. If the variable i reaches N which is the predetermined number of pieces of training data (YES in step S108), the character recognition apparatus 1 sets the kernel function K, for example, illustrated in Expression (2) described above (in step S110), and generates the objective function illustrated in Expression (3) described above (in step S111).

The character recognition apparatus 1 determines a support vector for the feature-point data $x_1$ to $x_N$ on the basis of the feature-point data $x_1$ to $x_N$, the kernel function, and the objective function (in step S112), generates a discriminant function on the basis of the determined support vector (in step S113), and ends the process. Description about these processes is made with reference to Expressions 1 to 9 described above.

Character-Pattern Segmentation Process

Description will be made about a process (character-pattern segmentation process) of segmenting an unknown handwritten character string into character patterns on the basis of identification results obtained by the discriminator which has learned how to identify a stroke as an in-same-character stroke or an after-character-transition stroke.

Figure 5:
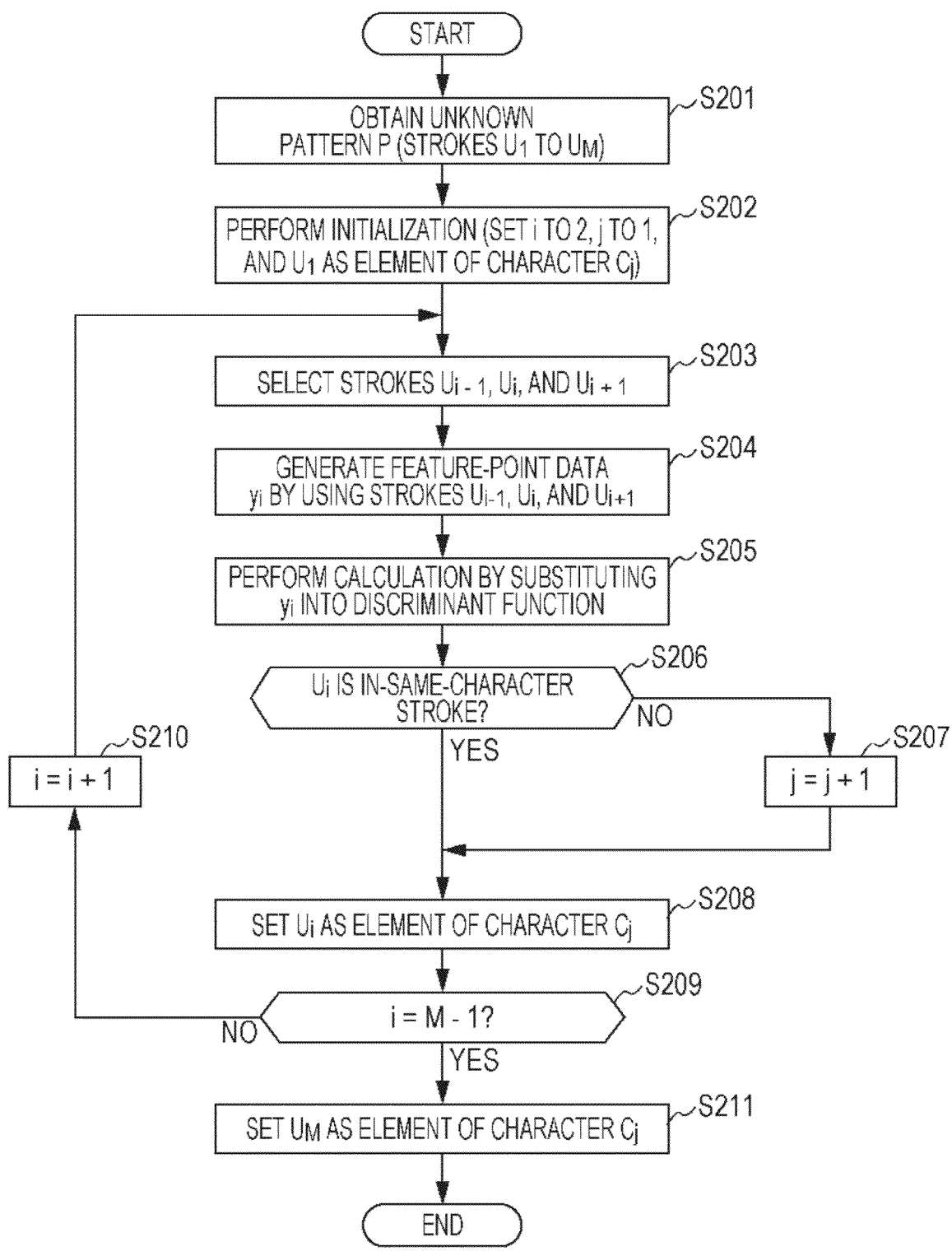
FIG. 5 is a flowchart of a character-pattern segmentation process.

FIG. 5 is a flowchart of a character-element segmentation process performed in the character recognition apparatus 1. As illustrated in FIG. 5, the character recognition apparatus 1 obtains an unknown handwritten character string, i.e., an unknown pattern P (in step S201). An unknown pattern P includes strokes $U_1$ to $U_M$, and the stroke $U_M$ is an in-same-character stroke in the example described below.

The character recognition apparatus 1 performs initialization by setting a variable i to 2, a variable j to 1, and the stroke $U_1$ as an element of a character $C_j$ (in step S202), and selects three subsequent strokes $U_{i-1}$, $U_i$, and $U_{i+1}$ from the unknown pattern P (in step S203).

The character recognition apparatus 1 extracts feature points for each of the selected strokes $U_{i-1}$, $U_i$, and $U_{i+1}$, and generates feature-point data $y_i$ for the stroke $U_i$ on the basis of the extracted feature points (in step S204).

The character recognition apparatus 1 performs calculation by substituting the feature-point data $y_i$ for the stroke $U_i$ into the discriminant function generated in the learning process (in step S205). If the calculation result indicates that the stroke $U_i$ is an in-same-character stroke (YES in step S206), the process proceeds to step S208. If the calculation result indicates that the stroke $U_i$ is an after-character-transition stroke (NO in step S206), the character recognition apparatus 1 increments the variable j by 1 (in step S207), and the process proceeds to step S208.

After the result from the process in step S206 is determined to be YES or the process in step S207 is performed, the character recognition apparatus 1 sets the stroke $U_i$ as an element of the character $C_j$ (in step S208).

If the variable i does not reach M−1 (NO in step S209), the character recognition apparatus 1 increments the variable i by 1 (in step S210), and the process returns back to step S203. If the variable i reaches M−1 (YES in step S209), the character recognition apparatus 1 sets the stroke $U_M$ as an element of the character $C_j$ (in step S211), and ends the process.

Character Recognition Process

A character recognition process performed after the character-pattern segmentation process will be described below.

Figure 6:
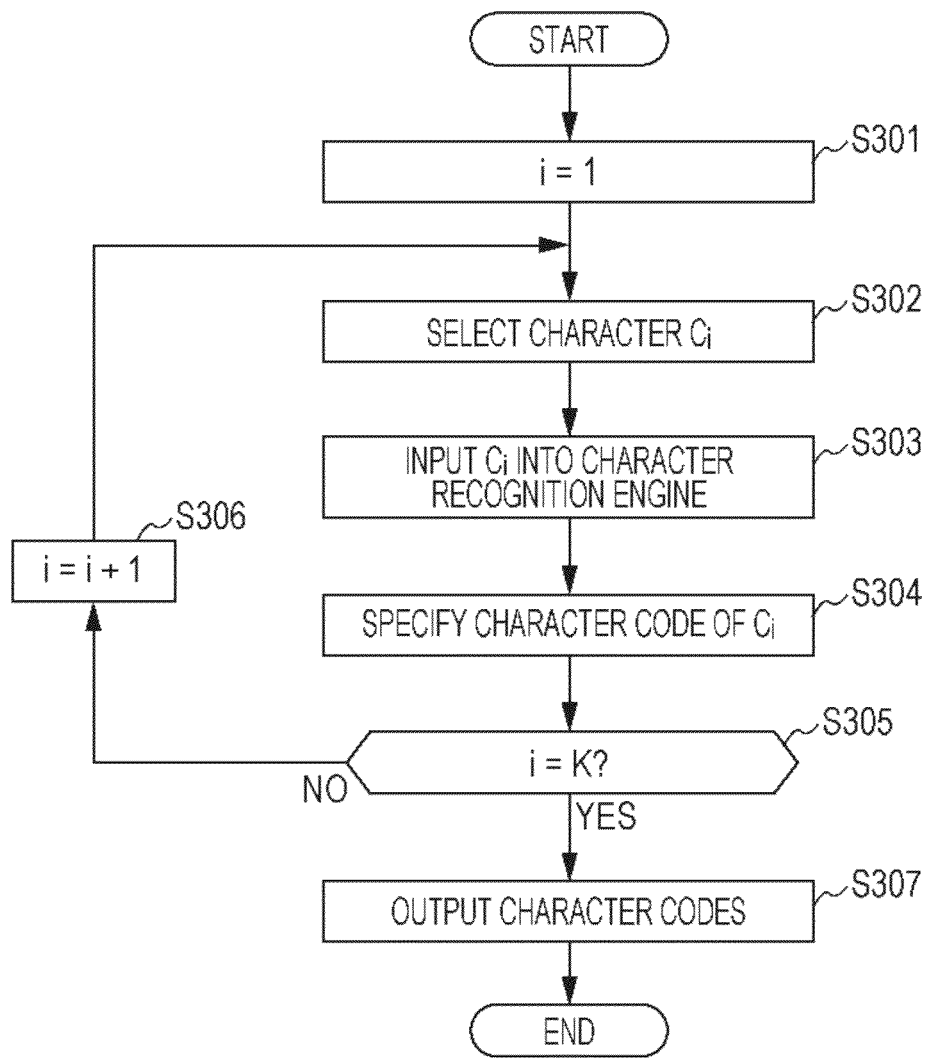
FIG. 6 is a flowchart of a character recognition process.

FIG. 6 is a flowchart of a character recognition process. In this flow, assume that characters $C_i$ (i is an integer from 1 to K) are obtained from an unknown pattern P as the result obtained through the flow illustrated in FIG. 5.

As illustrated in FIG. 6, the character recognition apparatus 1 sets a variable i to 1 (in step S301), and selects a character $C_1$ (in step S302). A character $C_1$ includes stroke information of elements belonging to the character $C_i$.

The character recognition apparatus 1 inputs the character $C_i$ into a predetermined character recognition engine (in step S303), and specifies the character code of the character $C_i$ on the basis of the output from the character recognition engine (in step S304).

If the variable i does not reach K (NO in step S305), the character recognition apparatus 1 increments the variable i by 1 (in step S306), and the process returns back to step S302. If the variable i reaches K (YES in step S305), the character recognition apparatus 1 outputs character codes $C_1$ to $C_K$ (in step S307), and ends the process.

The character recognition apparatus 1 described above performs character segmentation on online handwritten characters by using machine learning, improving the accuracy of character segmentation. As a result, compared with the case where the method described herein is not used, the accuracy of character recognition is also improved.

The present invention is not limited to the above-described exemplary embodiment. For example, in the above-described exemplary embodiment, information about feature points for strokes $S_{i-1}$, $S_i$, and $S_{i+1}$ are used when feature-point data for the stroke $S_i$ is generated. Alternatively, information about feature points for strokes $S_{i-n}$ to $S_{i+m}$ may be used where n and m are integers equal to or larger than 0.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A character recognition apparatus comprising:
an extracting unit that extracts a feature point for a line in a handwritten character;
a first generation unit that generates first feature data based on a feature point extracted by the extracting unit, for a line group which includes an in-same-character line and which is selected from lines included in a handwritten character string containing a plurality of handwritten characters, each of the plurality of handwritten characters being a character for which a character code is specified, the in-same-character line being a line in a character identical to a character for a previous line which is written just before the in-same-character line;
a second generation unit that generates second feature data based on a feature point extracted by the extracting unit, for a line group which includes an after-character-transition line and which is selected from lines included in a handwritten character string containing a plurality of handwritten characters, each of the plurality of handwritten characters being a character for which a character code is specified, the after-character-transition line being a line in a character different from a character for a previous line which is written just before the after-character-transition line;
a learning unit that causes a discriminator to learn a classification for an in-same-character line and a classification for an after-character-transition line on the basis of the first feature data and the second feature data; and
a determination unit that determines whether each of lines included in a handwritten character string in which character codes are unknown is an in-same-character line or an after-character-transition line, on the basis of which classification is determined by the discriminator for feature data based on a feature point extracted by the extracting unit from the line.

2. The character recognition apparatus according to claim 1, further comprising:
a specifying unit that specifies character patterns included in the unknown handwritten character string, on the basis of the classification results determined by the determination unit for the respective lines included in the unknown handwritten character string; and
a character-code identification unit that identifies, for each of the character patterns specified by the specifying unit, a character code of the character pattern on the basis of a shape and writing order of a line included in the character pattern.

3. The character recognition apparatus according to claim 1,
wherein the feature data is generated on the basis of a position of a feature point extracted by the extracting unit for a line group including a target line and lines written just before and just after the target line.

4. The character recognition apparatus according to claim 2,
wherein the feature data is generated on the basis of a position of a feature point extracted by the extracting unit for a line group including a target line and lines written just before and just after the target line.

5. The character recognition apparatus according to claim 1,
wherein the learning unit causes the discriminator to learn the classifications for an in-same-character line and an after-character-transition line, on the basis of a distance calculated by comparing a position of a feature point included in the first feature data with a position of a feature point included in the second feature data on the basis of dynamic programming.

6. The character recognition apparatus according to claim 2,
wherein the learning unit causes the discriminator to learn the classifications for an in-same-character line and an after-character-transition line, on the basis of a distance calculated by comparing a position of a feature point included in the first feature data with a position of a feature point included in the second feature data on the basis of dynamic programming.

7. The character recognition apparatus according to claim 3,
wherein the learning unit causes the discriminator to learn the classifications for an in-same-character line and an after-character-transition line, on the basis of a distance calculated by comparing a position of a feature point included in the first feature data with a position of a feature point included in the second feature data on the basis of dynamic programming.

8. The character recognition apparatus according to claim 4,
wherein the learning unit causes the discriminator to learn the classifications for an in-same-character line and an after-character-transition line, on the basis of a distance calculated by comparing a position of a feature point included in the first feature data with a position of a feature point included in the second feature data on the basis of dynamic programming.

9. A non-transitory computer readable medium storing a program causing a computer to execute a process for recognizing a character, the process comprising:
- extracting a feature point for a line in a handwritten character;
- generating first feature data based on a feature point extracted in the extracting of a feature point, for a line group which includes an in-same-character line and which is selected from lines included in a handwritten character string containing a plurality of handwritten characters, each of the plurality of handwritten characters being a character for which a character code is specified, the in-same-character line being a line in a character identical to a character for a previous line which is written just before the in-same-character line;
- generating second feature data based on a feature point extracted in the extracting of a feature point, for a line group which includes an after-character-transition line and which is selected from lines included in a handwritten character string containing a plurality of handwritten characters, each of the plurality of handwritten characters being a character for which a character code is specified, the after-character-transition line being a line in a character different from a character for a previous line which is written just before the after-character-transition line;
- causing a discriminator to learn a classification for an in-same-character line and a classification for an after-character-transition line on the basis of the first feature data and the second feature data; and
- determining whether each of lines included in a handwritten character string in which character codes are unknown is an in-same-character line or an after-character-transition line, on the basis of which classification is determined by the discriminator for feature data based on a feature point extracted from the line in the extracting of a feature point.

10. A character recognition method comprising:
- extracting a feature point for a line in a handwritten character;
- generating first feature data based on a feature point extracted in the extracting of a feature point, for a line group which includes an in-same-character line and which is selected from lines included in a handwritten character string containing a plurality of handwritten characters, each of the plurality of handwritten characters being a character for which a character code is specified, the in-same-character line being a line in a character identical to a character for a previous line which is written just before the in-same-character line;
- generating second feature data based on a feature point extracted in the extracting of a feature point, for a line group which includes an after-character-transition line and which is selected from lines included in a handwritten character string containing a plurality of handwritten characters, each of the plurality of handwritten characters being a character for which a character code is specified, the after-character-transition line being a line in a character different from a character for a previous line which is written just before the after-character-transition line;
- causing a discriminator to learn a classification for an in-same-character line and a classification for an after-character-transition line on the basis of the first feature data and the second feature data; and
- determining whether each of lines included in a handwritten character string in which character codes are unknown is an in-same-character line or an after-character-transition line, on the basis of which classification is determined by the discriminator for feature data based on a feature point extracted from the line in the extracting of a feature point.

* * * * *